(12) United States Patent
Wolf et al.

(10) Patent No.: US 12,385,758 B2
(45) Date of Patent: Aug. 12, 2025

(54) LOCATION-SYNCHRONOUS AVERAGING OF CONNECTED VEHICLE DATA

(71) Applicant: FORD GLOBAL TECHNOLOGIES, LLC, Dearborn, MI (US)

(72) Inventors: Christopher Wolf, Ann Arbor, MI (US); Michael W. Degner, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 470 days.

(21) Appl. No.: 17/932,843

(22) Filed: Sep. 16, 2022

(65) Prior Publication Data

US 2024/0094024 A1    Mar. 21, 2024

(51) Int. Cl.
   *G01C 21/00*    (2006.01)
   *G01S 19/42*    (2010.01)
   *G06F 17/18*    (2006.01)

(52) U.S. Cl.
   CPC ..... *G01C 21/3815* (2020.08); *G01C 21/3841* (2020.08); *G01C 21/3848* (2020.08); *G01S 19/42* (2013.01); *G06F 17/18* (2013.01)

(58) Field of Classification Search
   CPC ............ G01C 21/3815; G01C 21/3841; G01C 21/3848; G01S 19/42; G06F 17/18
   See application file for complete search history.

(56) References Cited

U.S. PATENT DOCUMENTS

| | | | |
|---|---|---|---|
| 9,430,944 B2 | 8/2016 | Grimm et al. | |
| 9,550,495 B2 | 1/2017 | Tatourian et al. | |
| 10,586,024 B1 * | 3/2020 | Patton | G06F 21/6245 |
| 10,795,380 B1 * | 10/2020 | Patton | G06Q 50/01 |
| 11,027,743 B1 * | 6/2021 | Dutordoir | G05B 13/028 |
| 11,157,007 B2 | 10/2021 | Dong et al. | |
| 11,928,959 B2 * | 3/2024 | Higuchi | G08G 1/04 |
| 2020/0081445 A1 * | 3/2020 | Stetson | G05D 1/0221 |
| 2020/0262438 A1 | 8/2020 | Bai et al. | |
| 2022/0017090 A1 | 1/2022 | Sams et al. | |
| 2022/0319483 A1 * | 10/2022 | James | G10H 1/38 |
| 2024/0094024 A1 * | 3/2024 | Wolf | G01C 21/3841 |
| 2024/0221500 A1 * | 7/2024 | Torgerson | G08G 1/0112 |

OTHER PUBLICATIONS

Perera et al., Generating Lane Level Road Data From Vehicle Trajectories Using Kernel Density Estimation, Proceedings of the 16h International IEEE Annual Conference on Intelligent Transportation Systems (ITSC 2013), The Hague, The Netherlands, Oct. 6-9, 2013.

Xie et al., Kernel Density Estimation of Traffic Accidents in a Network Space, Computers, Environment, and Urban Systems, 35 (5), 396-406, Jun. 2008.

\* cited by examiner

*Primary Examiner* — Hussein Elchanti
(74) *Attorney, Agent, or Firm* — Joseph Zane; Brooks Kushman P.C.

(57) ABSTRACT

Location-synchronous averaging of connected vehicle data is provided. Connected vehicle data, including events occurring to a plurality of vehicles driving along roadways and location coordinates at which the respective events occurred, is aggregated. A kernel density estimation is performed to smoothly aggregate neighboring event counts. The locations of conditions along the roadways are indicated as being where the aggregate neighboring event counts have a value over a predefined threshold.

20 Claims, 8 Drawing Sheets

LOCATION-SYNCHRONOUS AVERAGING OF CONNECTED VEHICLE DATA

TECHNICAL FIELD

Aspects of the present disclosure generally relate to location-synchronous averaging of connected vehicle data.

BACKGROUND

Road surface defects, such as potholes and cracks cause significant damage to vehicles every year. To identify road surface quality, labor-intensive surveying and purpose-built measurement systems may be used. Vehicle features have been developed to help manage vehicle stability during icy driving conditions. These features are typically reactive, instead of proactive. Prediction of icy surfaces also may be challenging due to the wide variety of road surface and ambient conditions that can affect vehicle traction.

SUMMARY

In one or more illustrative examples, a system for implementing location-synchronous averaging of connected vehicle data is provided. The system includes a data store configured to maintain connected vehicle data. The system also includes a cloud server, in communication with the data store. The cloud server is programmed to aggregate the connected vehicle data including events occurring to a plurality of vehicles driving along roadways and location coordinates at which the respective events occurred, perform a kernel density estimation (KDE) to smoothly aggregate neighboring event counts, and indicate locations of conditions along the roadways as being where the aggregate neighboring event counts have a value over a predefined threshold.

In one or more illustrative examples, a method for implementing location-synchronous averaging of connected vehicle data is provided. Connected vehicle data, including events occurring to a plurality of vehicles driving along roadways and location coordinates at which the respective events occurred, is aggregated. The location coordinates are rasterized to discretize the events into a histogram binning, placing each event within a grid cell of the histogram and assigning each grid cell to a count of the events placed within the respective grid cell. A binned kernel density estimation is performed to smoothly aggregate neighboring event counts across the histogram binning. The locations of conditions along the roadways are indicated as being the grid cells of the histogram having a value over a predefined threshold.

In one or more illustrative examples, a non-transitory computer-readable medium includes instructions for implementing location-synchronous averaging of connected vehicle data that, when executed by one or more processors of a cloud server, cause the cloud server to perform operations including to receive connected vehicle data from a plurality of vehicles over a communication network; aggregate the connected vehicle data including events occurring to the plurality of vehicles driving along roadways and location coordinates at which the respective events occurred; rasterize the location coordinates to discretize the events into a histogram binning, placing each event within a grid cell of the histogram and assigning each grid cell to a count of the events placed within the respective grid cell; perform a binned kernel density estimation to smoothly aggregate neighboring event counts across the histogram binning, wherein the binned KDE utilizes a two-dimensional convolution with a Gaussian kernel for smoothly aggregating the neighboring event counts; normalize the counts of each grid cell into a normalized severity index; and indicate locations of conditions along the roadways as being the grid cells of the histogram having a value along the normalized severity index over a predefined threshold.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications.

Aspects of the disclosure relate to aggregating connected vehicle data from vehicles to identify geospatial locations that have high incidence of conditions. The conditions may include, as some non-limiting examples, traction control issues (e.g., areas where wheel-slip is observed) or detection of road surface defects (e.g., potholes). Locations of common instances of occurrence of the conditions may be identified using a combination on on-vehicle sensors and edge computing capability, in combination with cloud-based data collection and processing. Information involving the location of such conditions may be disseminated to vehicle operators to inform vehicle control system behaviors. The location of such conditions may also be provided to third parties, such as local road agencies.

Figure 1:
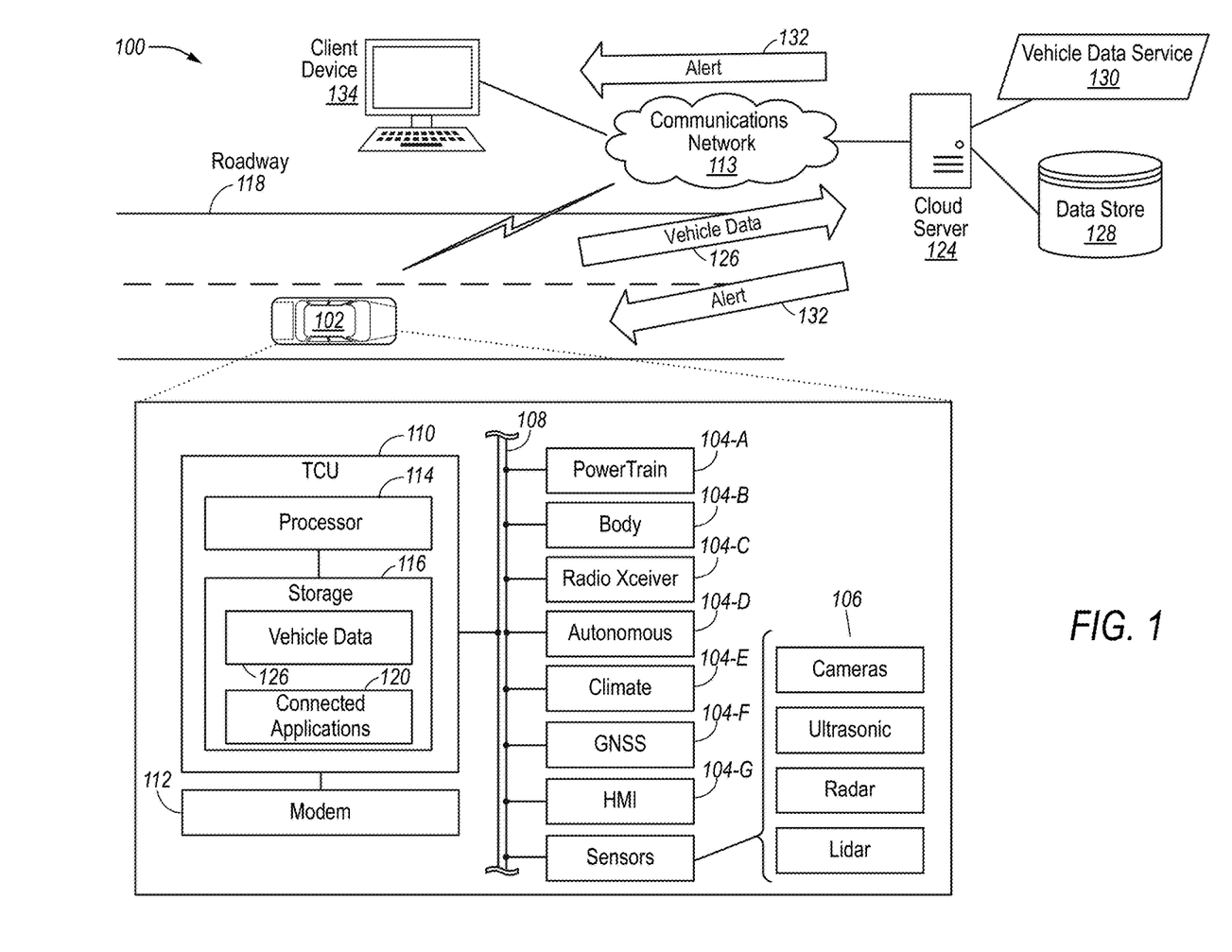
FIG. 1 illustrates an example system for implementing location-synchronous averaging of connected vehicle data.

FIG. 1 illustrates an example system 100 system implementing location-synchronous averaging of connected vehicle data 126. The vehicle 102 may include various types of automobile, crossover utility vehicle (CUV), sport utility vehicle (SUV), truck, recreational vehicle, boat, plane or other mobile machine for transporting people or goods. Such vehicles 102 may be human-driven or autonomous. In many cases, the vehicle 102 may be powered by an internal combustion engine. As another possibility, the vehicle 102 may be a battery electric vehicle (BEV) powered by one or more electric motors. As a further possibility, the vehicle 102 may be a hybrid electric vehicle (HEV) powered by both an internal combustion engine and one or more electric motors, such as a series hybrid electric vehicle (SHEV), a parallel hybrid electrical vehicle (PHEV), or a parallel/series hybrid electric vehicle (PSHEV). Alternatively, the vehicle 102 may be an Automated Vehicle (AV). The level of automation may vary between variant levels of driver assistance technology to a fully automatic, driverless vehicle. As the type and configuration of vehicle 102 may vary, the capabilities of the vehicle 102 may correspondingly vary. As some other possibilities, vehicles 102 may have different capabilities with respect to passenger capacity, towing ability and capacity, and storage volume. For title, inventory, and other purposes, vehicles 102 may be associated with unique identifiers, such as vehicle identification numbers (VINs). It should be noted that while automotive vehicles 102 are being used as examples of traffic participants, other types of traffic participants may additionally or alternately be used, such as bicycles, scooters, and pedestrians.

The vehicle 102 may include a plurality of controllers 104 configured to perform and manage various vehicle 102 functions under the power of the vehicle battery and/or drivetrain. As depicted, the example vehicle controllers 104 are represented as discrete controllers 104 (i.e., 104A through 104G). However, the vehicle controllers 104 may share physical hardware, firmware, and/or software, such that the functionality from multiple controllers 104 may be integrated into a single controller 104, and that the functionality of various such controllers 104 may be distributed across a plurality of controllers 104.

As some non-limiting vehicle controller 104 examples: a powertrain controller 104A may be configured to provide control of engine operating components (e.g., idle control components, fuel delivery components, emissions control components, etc.) and for monitoring status of such engine operating components (e.g., status of engine codes); a body controller 104B may be configured to manage various power control functions such as exterior lighting, interior lighting, keyless entry, remote start, and point of access status verification (e.g., closure status of the hood, doors and/or trunk of the vehicle 102); a radio transceiver controller 104C may be configured to communicate with key fobs, mobile devices, or other local vehicle 102 devices; an autonomous controller 104D may be configured to provide commands to control the powertrain, steering, or other aspects of the vehicle 102; a climate control management controller 104E may be configured to provide control of heating and cooling system components (e.g., compressor clutch, blower fan, temperature sensors, etc.); a global navigation satellite system (GNSS) controller 104F may be configured to provide vehicle location information; and a human-machine interface (HMI) controller 104G may be configured to receive user input via various buttons or other controls, as well as provide vehicle status information to a driver, such as fuel level information, engine operating temperature information, and current location of the vehicle 102.

The controllers 104 of the vehicle 102 may make use of various sensors 106 in order to receive information with respect to the surroundings of the vehicle 102. In an example, these sensors 106 may include one or more of cameras (e.g., advanced driver-assistance system (ADAS) cameras), ultrasonic sensors, radar systems, and/or lidar systems.

One or more vehicle buses 108 may include various methods of communication available between the vehicle controllers 104, as well as between a telematics control unit (TCU) 110 and the vehicle controllers 104. As some non-limiting examples, the vehicle bus 108 may include one or more of a vehicle controller area network (CAN), an Ethernet network, and a media-oriented system transfer (MOST) network.

The TCU 110 may include network hardware configured to facilitate communication between the vehicle controllers 104 and with other devices of the system 100. For example, the TCU 110 may include or otherwise access a modem 112 configured to facilitate communication over a communication network 113. The TCU 110 may, accordingly, be configured to communicate over various protocols, such as with the communication network 113 over a network protocol (such as Uu). The TCU 110 may, additionally, be configured to communicate over a broadcast peer-to-peer protocol (such as PC5), to facilitate cellular vehicle-to-everything (C-V2X) communications with devices such as other vehicles 102. It should be noted that these protocols are merely examples, and different peer-to-peer and/or cellular technologies may be used.

The TCU 110 may include various types of computing apparatus in support of performance of the functions of the TCU 110 described herein. In an example, the TCU 110 may include one or more processors 114 configured to execute computer instructions, and a storage 116 medium on which the computer-executable instructions and/or data may be maintained. A computer-readable storage medium (also referred to as a processor-readable medium or storage 116) includes any non-transitory (e.g., tangible) medium that participates in providing data (e.g., instructions) that may be read by a computer (e.g., by the processor(s)). In general, the processor 114 receives instructions and/or data, e.g., from the storage 116, etc., to a memory and executes the instructions using the data, thereby performing one or more processes, including one or more of the processes described herein. Computer-executable instructions may be compiled or interpreted from computer programs created using a variety of programming languages and/or technologies, including, without limitation, and either alone or in combination, Java, C, C++, C#, Fortran, Pascal, Visual Basic, Python, Java Script, Perl, etc.

The TCU 110 may be configured to include one or more interfaces from which vehicle information may be sent and received. This information can be sensed, recorded, and sent to one or more cloud servers 124. In an example, similar to the TCU 110, the cloud server 124 may also include one or more processors (not shown) configured to execute computer instructions, and a storage medium (not shown) on which the computer-executable instructions and/or data may be maintained.

The TCU 110 may be configured to facilitate the collection of connected vehicle data 126 and/or other vehicle information from the vehicle controllers 104 connected to the one or more vehicle buses 108. While only a single vehicle bus 108 is illustrated, it should be noted that in many examples, multiple vehicle buses 108 are included, usually with a subset of the controllers 104 connected to each vehicle bus 108. Accordingly, to access a given controller 104, the TCU 110 may be configured to maintain a mapping of which vehicle buses 108 are connected to which controllers 104, and to access the corresponding vehicle bus 108 for a controller 104 when communication with that particular controller 104 is desired.

The TCU 110 may be further configured to transmit connected vehicle data 126 over the communication network 113 for reception by the cloud server 124. In an example, the management of sending connected vehicle data 126 may be handled by a connected application 120 executed by the TCU 110. The connected vehicle data 126 may include signals retrieved from the controllers 104 and/or the sensors 106 over the vehicle buses 108. The connected vehicle data 126 may include data descriptive of various vehicle signals along the vehicle bus 108. These signals may be useful in the identification of conditions along the roadway 118.

For instance, for detection of a road surface issue, the relevant connected vehicle data 126 may include signals such as rate of change of velocity per unit of time for vertical chassis, latitudinal chassis, longitudinal chassis change in rate of speed per unit time; wheel speed; wheel torque (estimated); component temperatures; ambient conditions; tire inflation level; in-cabin sound measurements; and/or wheel slip events. In another example, for detection of a loss of traction condition, signals such as wheel slip events, excessive vehicle yaw relative to steering intent, and/or automatic braking system (ABS) events may be captured.

The connected vehicle data 126 may further include contextual information with respect to the location of the vehicle 102 when the events occurred. In an example, the TCU 110 may also capture location information from the GNSS controller 104F that may be used to augment the captured event information with locations of where the vehicle 102 was when the events occurred. The connected vehicle data 126 captured by the TCU 110 may also include, as some non-limiting examples, latitude, longitude, time, heading angle, speed, throttle position, brake status, steering angle, headlight status, wiper status, external temperature, turn signal status, ambient temperature or other weather conditions, etc.

In an example, the collection of connected vehicle data 126 may be performed in an event-based manner, in which the vehicles 102 send the connected vehicle data 126 to the cloud server 124 responsive to occurrence of the event. For instance, when an event is indicated by the vehicle 102 (such as by a sharp impulse in an rate of change of velocity per unit of time signal), the connected vehicle data 126 message may be sent from the modem 112 of the vehicle 102 to the cloud server 124, the message containing event information (loss magnitude, indicator type, etc.) as well as the GNSS coordinates at which the event occurred. Alternatively, this information can also be compiled from continuously sampled connected vehicle data 126, e.g., to the storage 116 of the TCU 110, which may allow for batch uploading of connected vehicle data 126 from the vehicle 102.

In addition to compiling event data from the sensors 106, the TCU 110 (and/or other controllers of the vehicle 102) may perform edge-processing capabilities to increase the quality of information and decrease the required data transmission. An example of use of the edge-processing may include up-sampling and interpolation of GNSS information to increase position resolution. Another example of edge-processing may include fusion of data from multiple sensors 106 (e.g., chassis accelerometer and wheel slip) to better identify road issue type and severity. Yet another example may include using tire pressure level to decouple vehicle dynamics from road surface issue magnitude estimation. An even further example may include using in-cabin sound measurements to refine estimate of road defect type and severity. Following the extraction of event information, as well as the possible inclusion of edge-processing techniques to increase the quality and data-efficiency of the information, the connected vehicle data 126 may be sent to the cloud server 124 via the on-vehicle modem 112 (or in other example, via a cell phone connected to the vehicle 102).

The cloud server 124 may be configured to receive the connected vehicle data 126 and store the connected vehicle data 126 in a data store 128. This information may be analyzed by a vehicle data service 130 to identify the conditions along the roadway 118. Using the connected vehicle data 126 received from many vehicles 102, a composite image of locations may be formed using the aggregate information to identify locations that are associated with various conditions, such as locations of wheel slip or potholes. In an example, the cloud server 124 may aggregate the data by collecting the data in the data store 128 for a specific timeframe and/or geographic boundary.

If a condition is detected, the vehicle data service 130 may send an alert 132 to vehicles 102 in the vicinity of the condition. This may allow the vehicle 102 to be informed of upcoming issues with the roadway 118, e.g., to inform control system behaviors of the vehicle 102 and/or to provide a message to occupants of the vehicle 102 to indicate the upcoming condition. The system 100 may further include one or more client devices 134 configured to access the cloud server 124 over the communication network 113. Using the services of the cloud server 124, one or more client devices 134 may be configured to query the connected vehicle data 126 for information, as well as to receive alerts alert 132, e.g., to use to dispatch repair crews to address the condition of the roadway 118.

Figure 2:
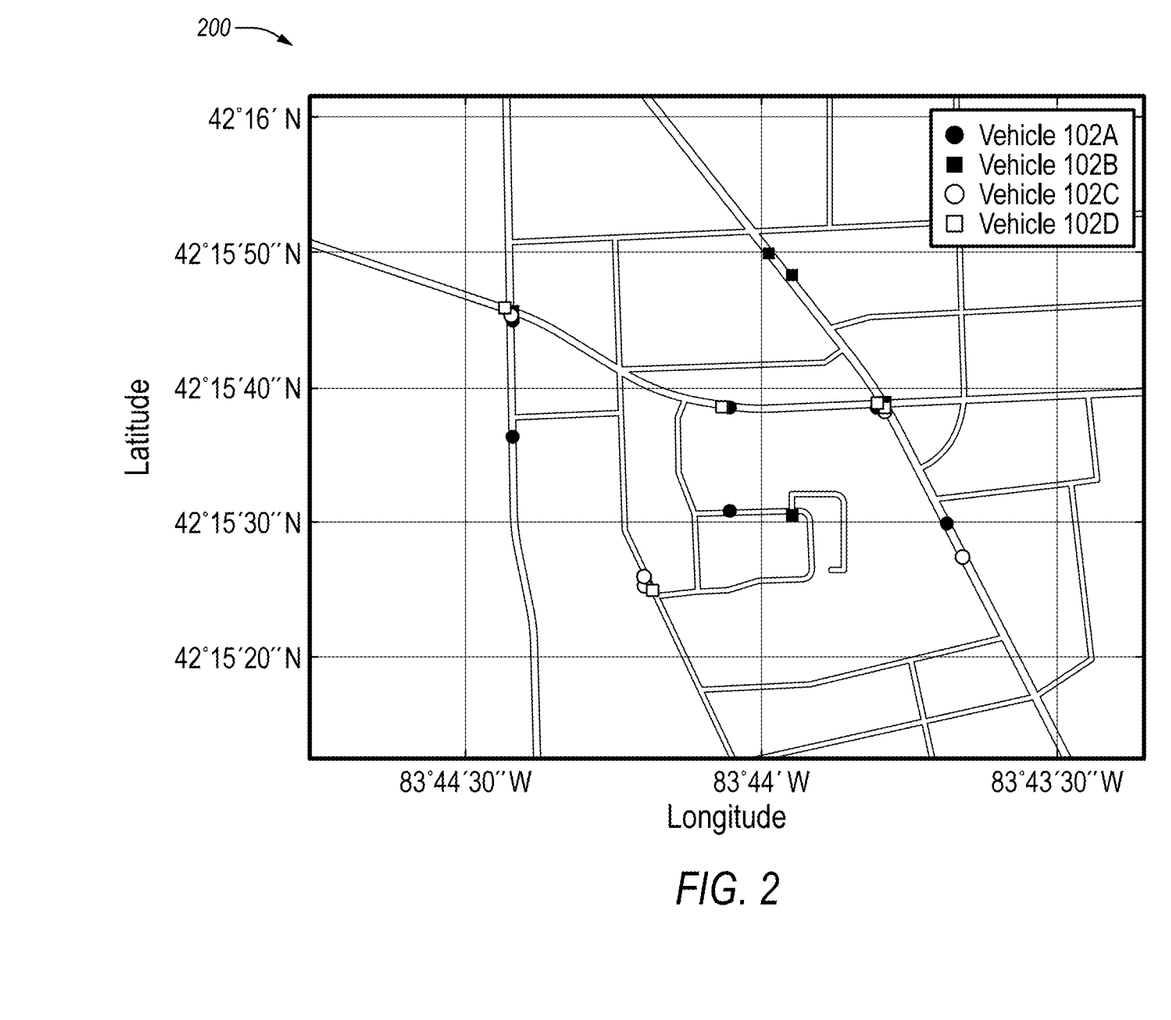
FIG. 2 illustrates an example of loss-of-traction event locations received to the cloud server from multiple vehicles.

FIG. 2 illustrates an example map 200 of loss-of-traction event locations received to the cloud server 124 from multiple vehicles 102. As shown, the map 200 covers a 2D area and indicates the locations of events from four vehicles 102A-D. It should be noted that in many examples connected vehicle data 126 from many more vehicles 102 may be aggregated by the vehicle data service 130. For simplicity's sake, the illustrated events are assumed to be equal in magnitude and type. However, in other examples magnitude or severity may additionally be considered in the aggregation and/or evaluation of the events.

Location-synchronous averaging is a technique that can aggregate information from any number of connected vehicles 102 to find locations most likely to experience a wide variety of events. Various approaches may be used to implement the aggregation and detection of conditions. For illustrative purposes an approach utilizing geospatial rasterization and binned KDE is discussed herein. This approach may be easy to implement, may scale well, and does not require much tuning or calibration. Other approaches may be used as well, as noted herein.

Responsive to the connected vehicle data 126 being received to the cloud server 124, it may be analyzed by the vehicle data service 130. For instance, the vehicle data service 130 may receive queries with respect to a specific location. To keep the computational burdens manageable this query may utilize geospatial constraints to isolate specific areas.

To facilitate analysis of the connected vehicle data 126, the vehicle data service 130 may rasterize the data to discretize the geospatial information. The size and density of the raster may be a design variable that may be used to balance objectives such as accuracy and resolution vs. computational burden.

Figure 3:
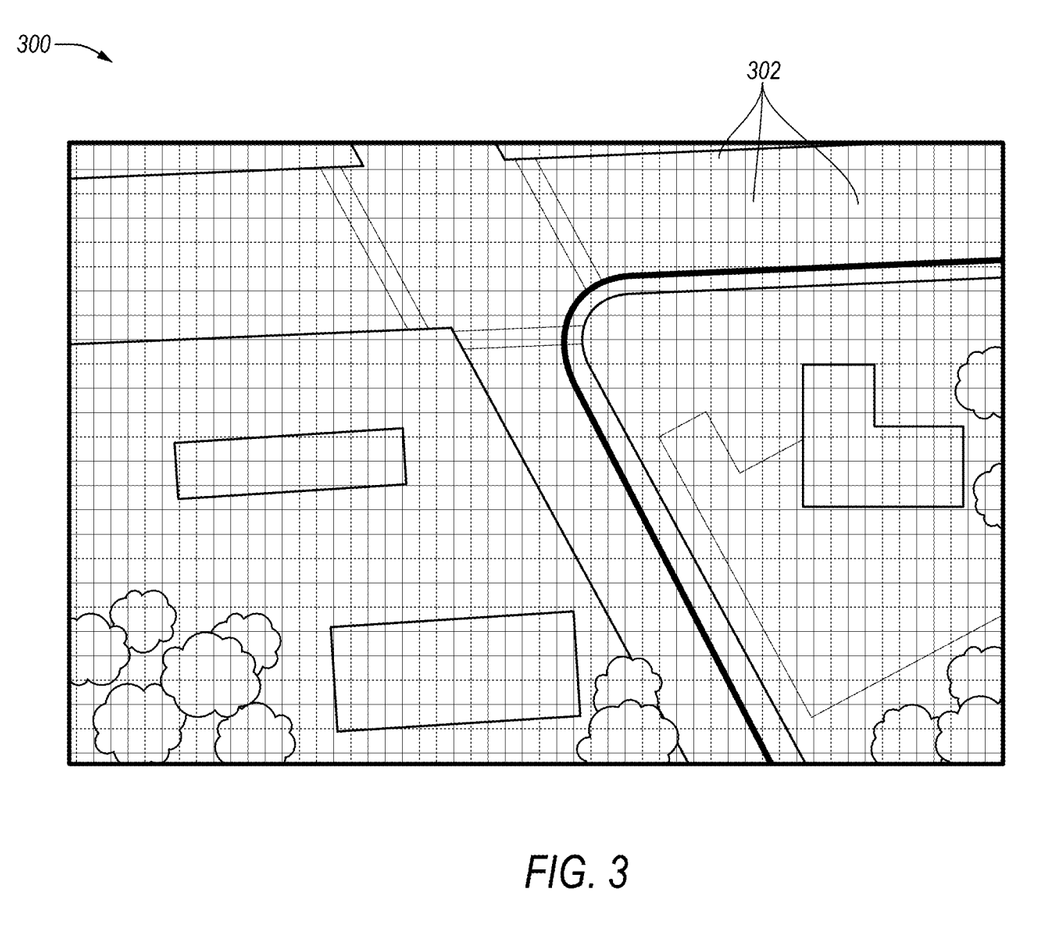
FIG. 3 illustrates an example geospatial grid showing an example rasterization.

FIG. 3 illustrates an example geospatial grid 300 showing an example rasterization 302. As shown, the example rasterization 302 has an approximately 10-foot grid spacing over a 2D area, although rasterization 302 with different sizes and shaping may be utilized. The rasterization 302 of the queried event data places each event from the connected vehicle data 126 within a grid cell of the raster. This can be efficiently handled with a 2-dimensional histogram binning algorithm. Scaled histogram binning algorithms are an alternative that can also capture event severity, with a tradeoff of computational complexity.

Figure 4:
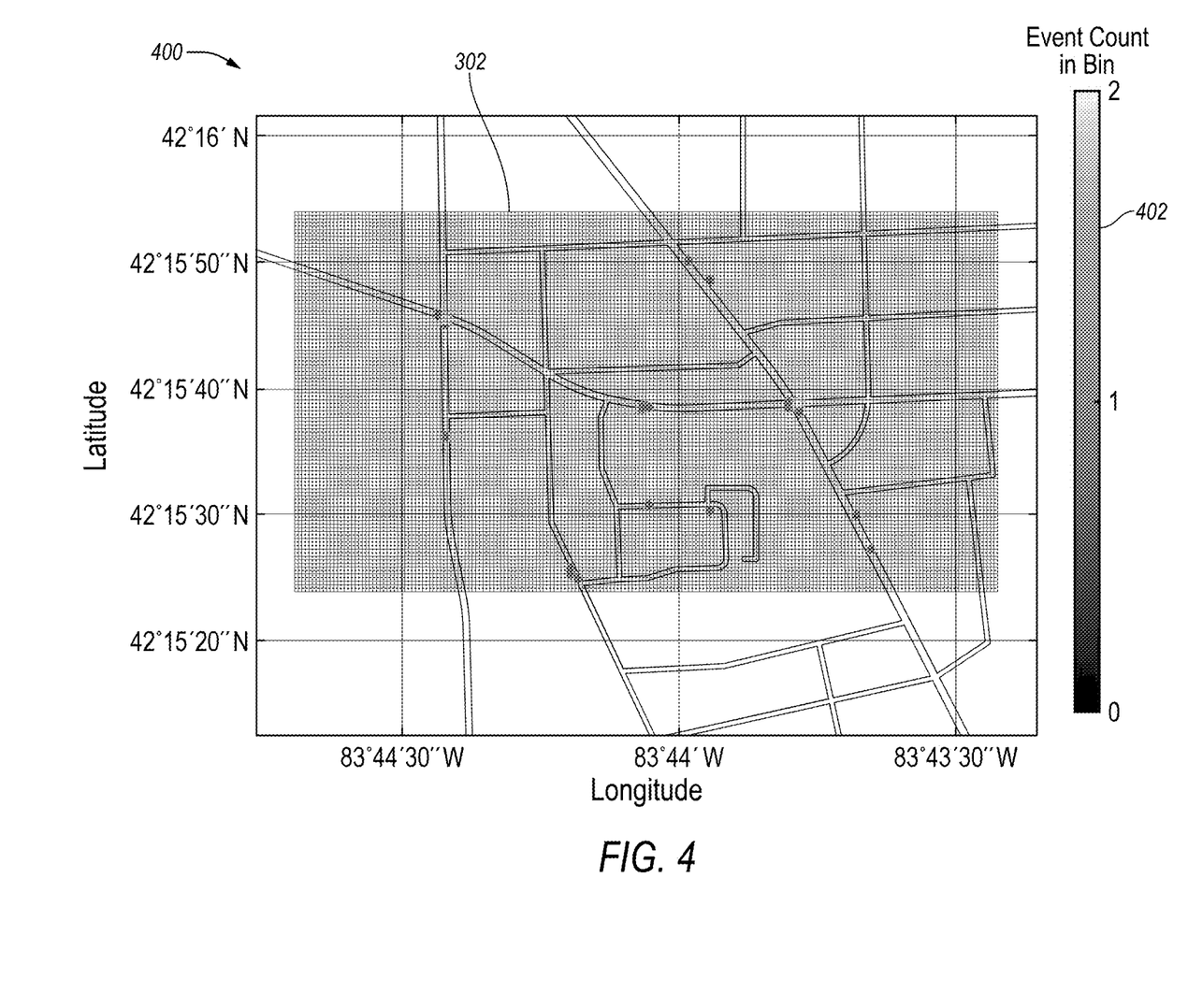
FIG. 4 illustrates an example histogram binning of the example connected vehicle data of FIG. 2.

FIG. 4 illustrates an example histogram binning 400 of the example connected vehicle data 126 of FIG. 2. As shown, the rasterization 302 may be overlaid on the map similar to as shown in FIG. 3 The histogram binning 400 illustrates that events in the connected vehicle data 126 that are sufficiently close (e.g., within the raster cell) fall into the same bin; however, events outside of this threshold are counted separately. Also as shown, a scale 402 may be provided that illustrates the quantity of events in each bin of the rasterization 302.

Using the data from the rasterization and aggregation, the vehicle data service 130 may employ a binned KDE algorithm to smoothly aggregate neighboring events. This may be efficiently realized via 2-dimensional convolution with a simple kernel. A Gaussian kernel may be a good choice due to its simple parameterization and computational simplicity.

Figure 5:
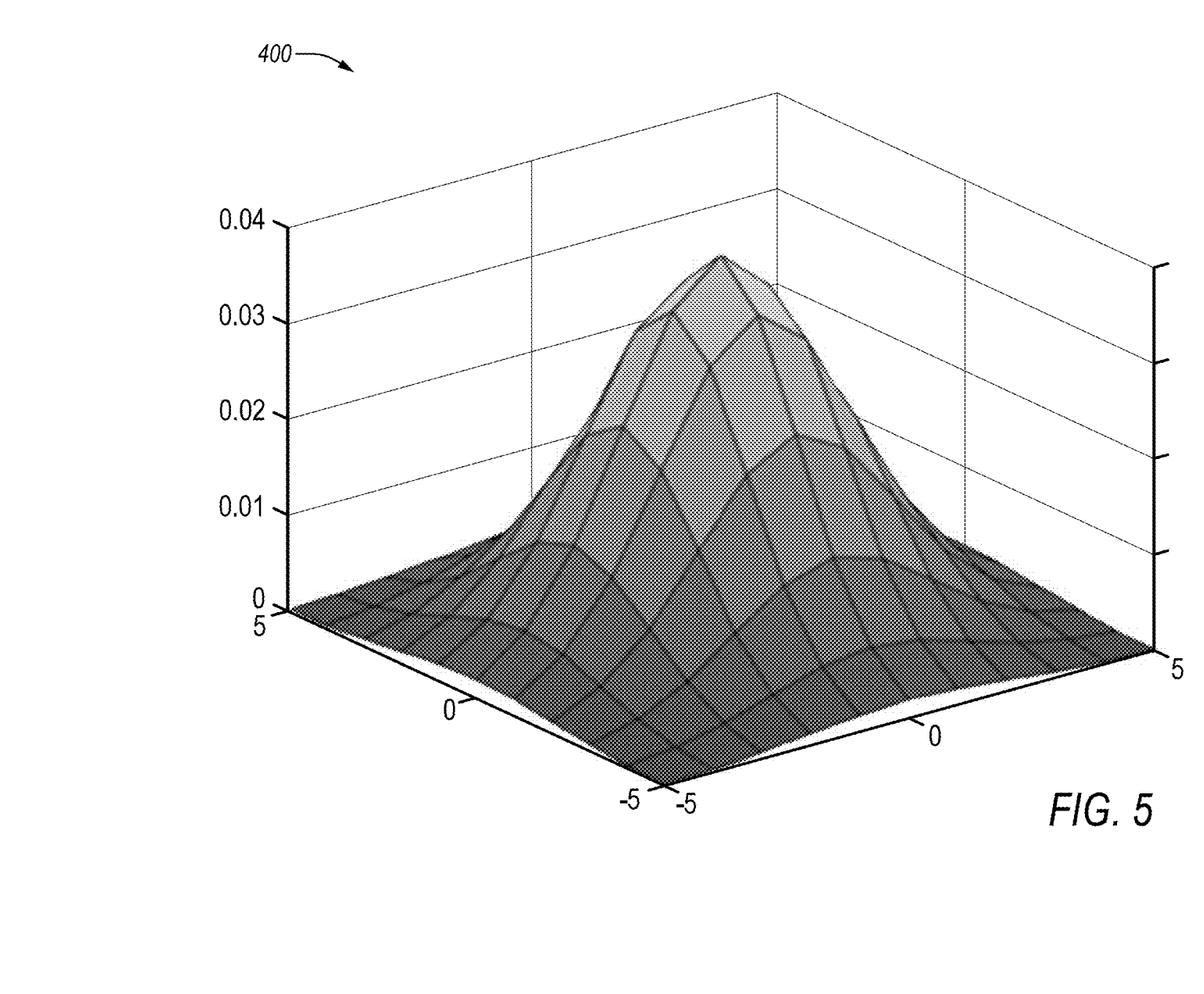
FIG. 5 illustrates an example Gaussian kernel, with the axis scaling based on the raster size.

FIG. 5 illustrates an example Gaussian kernel 500, with the axis scaling based on the raster size. In the illustrated example, the KDE kernel is based on a Gaussian distribution with a standard deviation of 3 grid units and a total support width of 10 grid units. The X and Y scales show this support area, from −5 to +5 in the X and Y directions, with Z corresponding to value. The net result of this binned-KDE via convolution is a smoothing of the event data. Conceptually, this can be considered as a way to deal with uncertainty in location data. If there are two events in adjacent raster grid cells, it is likely these are just separate manifestations of the same condition (e.g., due to the same traction-loss behavior across vehicles 102).

Figure 6:
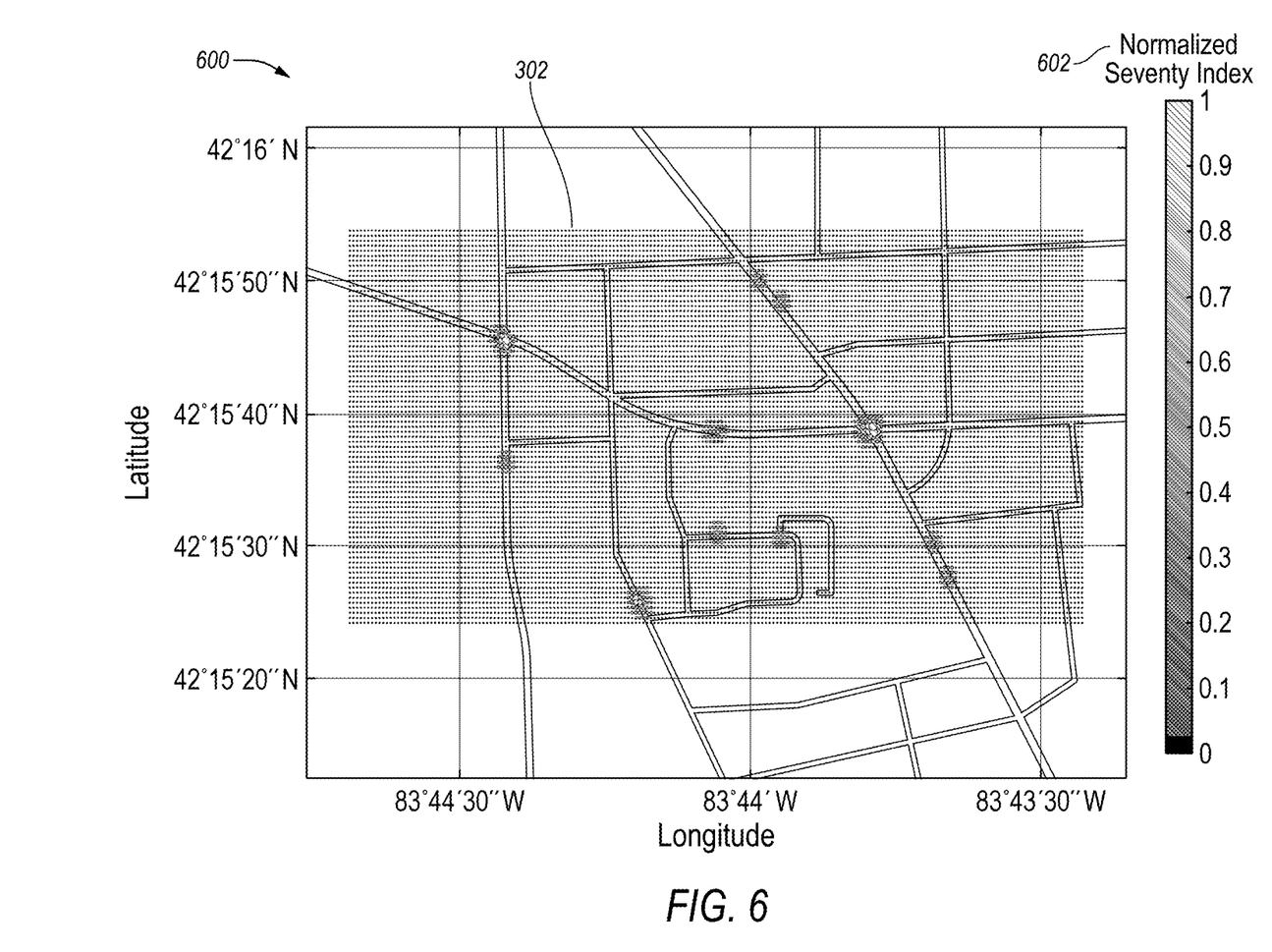
FIG. 6 illustrates an example map of a binned-KDE algorithm to develop the properties of the aggregation shown in FIG. 4.

FIG. 6 illustrates an example map 600 of a binned-KDE algorithm to develop the properties of the aggregation shown in FIG. 4. In this example, the severity of the final event likelihood map 600 is normalized, as indicated by the scale 602 to the right of the map 600.

As shown in the example map 600, there is an increase in event severity likelihood near larger arterial roads that are likely to experience larger traffic volumes relative to smaller local roads. This can lead to a disproportionate estimation of condition likelihood. This can be remedied by scaling the results by readily available traffic density information or by factoring in the number of discrete events that end up binned together. This can help to differentiate between a few large events or many small events.

Through this rasterization, binning, and KDE, a composite image of locations likely to correlate with conditions may be efficiently compiled. This approach may be performed at regular intervals for specific locations during specific periods, such as during inclement weather conditions, before and after road surface resurfacing projects, etc. This aggregate data may be is then disseminated to an operator of the vehicle 102, be used to inform vehicle 102 control system behaviors, and/or be transmitted to third parties.

In addition to the illustrated approaches to rasterization, binning, and convolution-based KDE there are other enhancements that may be provided by the vehicle data service 130 to allow for increased sensitivity and resolution.

In an example, a weighted histogram may be performed prior to computing the binned KDE. While the illustrated example in FIG. 6 treats each event as equal, any number of weighted histogram algorithms may be utilized. As one possibility, a simple scalable method may insert multiple virtual events instead of the single real event when the underlying event is sufficiently large. This may be done on a granular level (e.g., adding 1, 2, 3, 4, etc., virtual events depending on the size or other factors of the underling associated real event).

In another example, traditional and weighted KDE may be utilized. A traditional KDE may forego the rasterization and binning and instead convolve a sum of impulses that are each associated with an event. These events may be weighted to represent a magnitude of each event. This approach may increase resolution (as neighboring events will not get binned together), but the increased resolution may come at the expense of computational complexity. A traditional KDE may scale dramatically as the number of events increases and may not be well-suited for large-scale processing.

In yet another example, road/path-based event mapping may be utilized. The illustrated example of FIG. 6 accomplishes the location-synchronous averaging irrespective of the underlying road system and driving path. Yet, there may be specific instances in which the mapping of events to specific positions along a road or pre-defined route may be advantageous. This mapping may occur before the rasterization/binning step and may enable the use of traditional KDE methods as the number of events mapped to each road/path will be limited, the and the domain is now 1-dimensional (path/road position) instead of 2-dimensional (longitude and latitude). This may increase the effective resolution of the final analytics for instances in which enhanced resolution is desired.

The determination of locations of the roadway 118 having conditions may be disseminated to an end-user in various ways. One example approach to dissemination of alerts 132 may be by informing the occupants of the vehicle 102 via the HMI controller 104G. This can be accomplished by one or more of indicator lights, sounds, and/or messages in the cluster or infotainment screens. This indication may be created to give advanced notice that the vehicle 102 may be traversing a location having a determined roadway 118 condition. This indication may occur while driving or to update a navigational route set to the vehicle 102. For instance, road surface issues may be used by navigation system, such as to give the user the option to choose routes with higher quality roadways 118.

Another example approach to dissemination of alerts 132 may be through the vehicle controllers 104. This can include, as some non-limiting examples, to reduce speed of the vehicle 102 when speed is actively controlled by the autonomous controller 104D, to switch transmission and driveline into an all-wheel-drive mode when available via the powertrain controller 104A, alter active suspension mode via the body controller 104B, proactively engage a traction control feature of the powertrain controller 104A, etc.

A further approach to dissemination of alerts 132 may be through the transmittal of the locations of likely traction-loss events to a third party. This may include publicly available mapping and navigational entities (such as Google Maps and Waze) as well as commercially used fleet navigation systems. Yet another approach may be to convey the locations of the conditions to municipalities and/or other entities responsible for the maintenance of roads. For example, a road surface defect analysis may provide value for prioritizing and scheduling road surface repairs and maintenance, as trends over time may be extracted via windowing the events within a specific set of dates.

Figure 7:
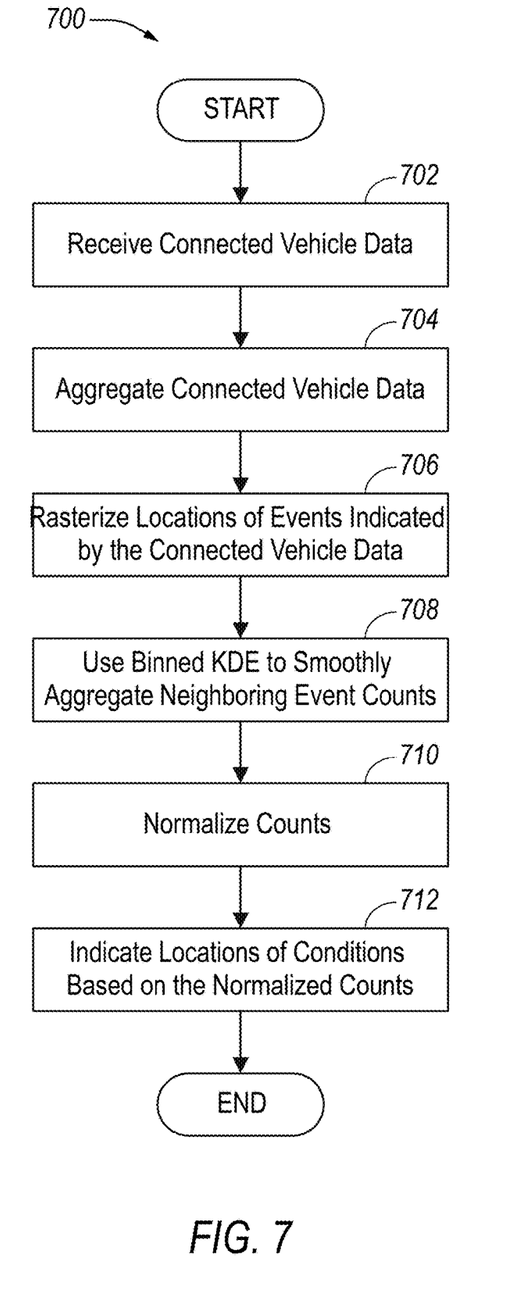
FIG. 7 illustrates an example process for implementing location-synchronous averaging of connected vehicle data by a cloud server.

FIG. 7 illustrates an example process 700 for implementing location-synchronous averaging of connected vehicle data 126 by a cloud server 124. In an example, the process 700 may be performed by operation of the vehicle data service 130 executed by the cloud server 124 in communication with the data store 128.

At operation 702, the cloud server 124 receives connected vehicle data 126. In an example, the cloud server 124 may receive connected vehicle data 126 from a plurality of vehicles 102 traveling along the roadway 118. In an example, the collection of connected vehicle data 126 may be performed in an event-based manner, in which the vehicles 102 send the connected vehicle data 126 to the cloud server 124 responsive to occurrence of the event. Alternatively, this information can also be received continuously from the vehicles 102.

The connected vehicle data 126 may include signals retrieved from the controllers 104 and/or the sensors 106 over the vehicle buses 108. The connected vehicle data 126 may include data descriptive of various signals along the vehicle bus 108. These signals may be useful in the identification of conditions along the roadway 118. The connected vehicle data 126 may further include contextual information with respect to the location of the vehicle 102 when the events occurred. In an example, the TCU 110 may also capture location information from the GNSS controller 104F that may be used to augment the captured event information with locations of where the vehicle 102 was when the events occurred.

At operation 704, the cloud server 124 aggregates the connected vehicle data 126. In an example, the cloud server 124 may aggregate the data by collecting the data in the data store 128 for a specific timeframe and/or geographic boundary. In doing so, a composite image of locations may be formed using the aggregate information to identify locations that are associated with various conditions, such as locations of wheel slip or potholes. An example aggregation of the connected vehicle data 126 is shown in the map 200 of FIG. 2.

At operation 706, the cloud server 124 rasterizes locations of events indicated by the connected vehicle data 126. The rasterization of the queried event data places each event from the connected vehicle data 126 within a grid cell of the raster. This can be efficiently handled with a 2-dimensional histogram binning 400 algorithm. Scaled histogram binning 400 algorithms are an alternative that can also capture event severity, with a tradeoff of computational complexity. The size and density of the raster may be a design variable that may be used to balance objectives such as accuracy and resolution vs. computational burden. As shown in the example geospatial grid 300 of FIG. 3, the example rasterization has an approximately 10-foot grid spacing.

At operation 708, the cloud server 124 uses a binned KDE to smoothly aggregate neighboring event counts. This may be efficiently realized via 2-dimensional convolution with a simple kernel. In an example, a Gaussian kernel 500 may be utilized, such as shown in FIG. 5.

At operation 710, the cloud server 124 normalizes the counts. For instance, the cloud servers 124 may normalize the counts to a fixed scale, such as 0 to 1, where 0 means the lowest likelihood and 1 means the greatest likelihood. FIG. 6 illustrates an example map 600 based on use of a binned-KDE algorithm. In this example, the severity of the final event likelihood map 600 is normalized, as indicated by the scale to the right of the map 600.

At operation 712, the cloud server 124 indicates locations of conditions based on the normalized counts. For instance, information involving the location of such conditions may be disseminated to vehicle operators to inform vehicle control system behaviors. The location of such conditions may also be provided to third parties, such as local road agencies. After operation 712, the process 700 ends.

Figure 8:
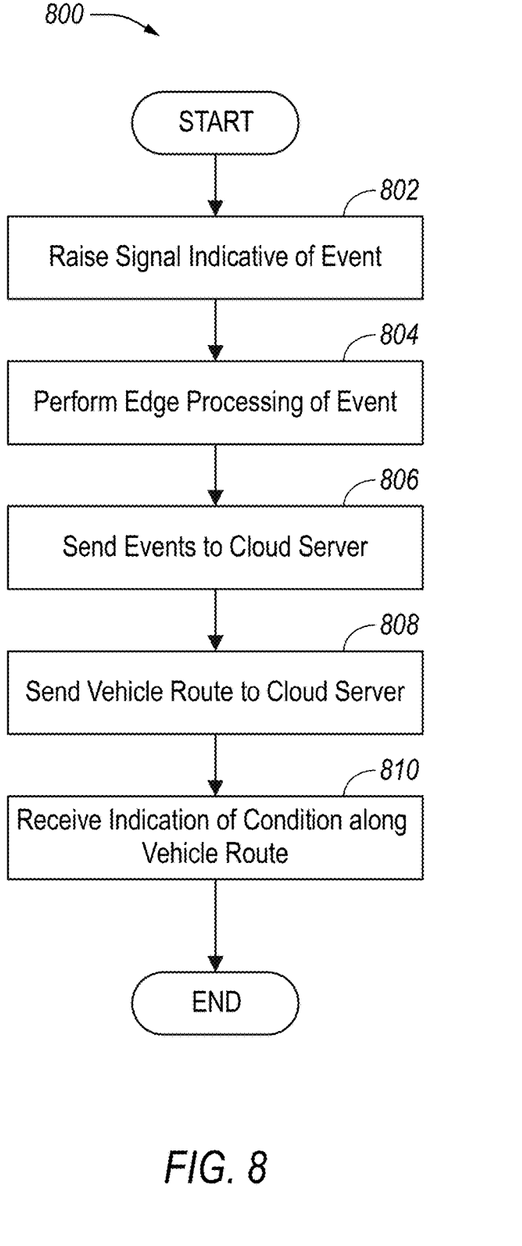
FIG. 8 illustrates an example process for utilizing location-synchronous averaging of connected vehicle data by a vehicle.

FIG. 8 illustrates an example process 800 for utilizing location-synchronous averaging of connected vehicle data 126 by a vehicle 102. In an example the process 800 may be performed by operation of the connected application 120 executed by the TCU 110 of the vehicle 102, where the TCU 110 allows the vehicle 102 to be in communication over the communication networks 113 with the vehicle data service 130 executed by the cloud server 124.

At operation 802, the vehicle 102 raises a signal indicative of an event. For instance, the TCU 110 may be configured to facilitate the collection of connected vehicle data 126 and/or other vehicle information from the vehicle controllers 104 connected to the one or more vehicle buses 108. The connected vehicle data 126 may include signals retrieved from the controllers 104 and/or the sensors 106 over the vehicle buses 108. The connected vehicle data 126 may include data descriptive of various vehicle signals along the vehicle bus 108. These signals may be useful in the identification of conditions along the roadway 118.

At operation 804, the vehicle 102 optionally performs edge processing of the event. An example of use of the edge-processing may include up-sampling and interpolation of GNSS information to increase position resolution. Another example of edge-processing may include fusion of data from multiple sensors 106 (e.g., chassis movement and wheel slip) to better identify road issue type and severity. Yet another example may include using tire pressure level to decouple vehicle dynamics from road surface issue magnitude estimation. An even further example may include using in-cabin sound measurements to refine estimate of road defect type and severity.

At operation 806, the vehicle 102 sends events to the cloud server 124. Following the extraction of event information, as well as the possible inclusion of edge-processing techniques to increase the quality and data-efficiency of the information, the TCU 110 may send the connected vehicle data 126 to the cloud server 124 via the on-vehicle modem 112 (or in other example, via a cell phone connected to the vehicle 102).

At operation 808, the vehicle 102 sends a route to the cloud server 124. In an example, the vehicle 102 may query the cloud server 124 for information with respect to the intended route of the vehicle 102. For instance, the vehicle 102 may be navigating a route to a destination using a navigational route set to the vehicle 102. This route may be sent to the cloud server 124 to allow the vehicle 102 to request information with respect to possible conditioning along the intended route. For instance, road surface issues may be used by navigation system, such as to give the user the option to choose routes with higher quality roadways 118.

At operation 810, the vehicle 102 receives an indication of a condition along the route. In an example, the vehicle 102 may receive one or more alerts 132 from the vehicle data service 130 responsive to the route sent at operation 808. For instance, information involving the location of such conditions may be disseminated to vehicle operators to inform vehicle control system behaviors. As one example, the information may be used to allow the vehicle 102 to update the route. After operation 810, the process 800 ends.

As a variation on the process 800, the location of conditions may be requested by a client device 134 of a third-party, such as a fleet or municipality, as opposed to being requested by the vehicle 102. This may allow the locations of the conditions to be conveyed to municipalities and/or other entities responsible for the maintenance of roads. For example, a road surface defect analysis may provide value for prioritizing and scheduling road surface repairs and maintenance, as trends over time may be extracted via windowing the events within a specific set of dates.

Figure 9:
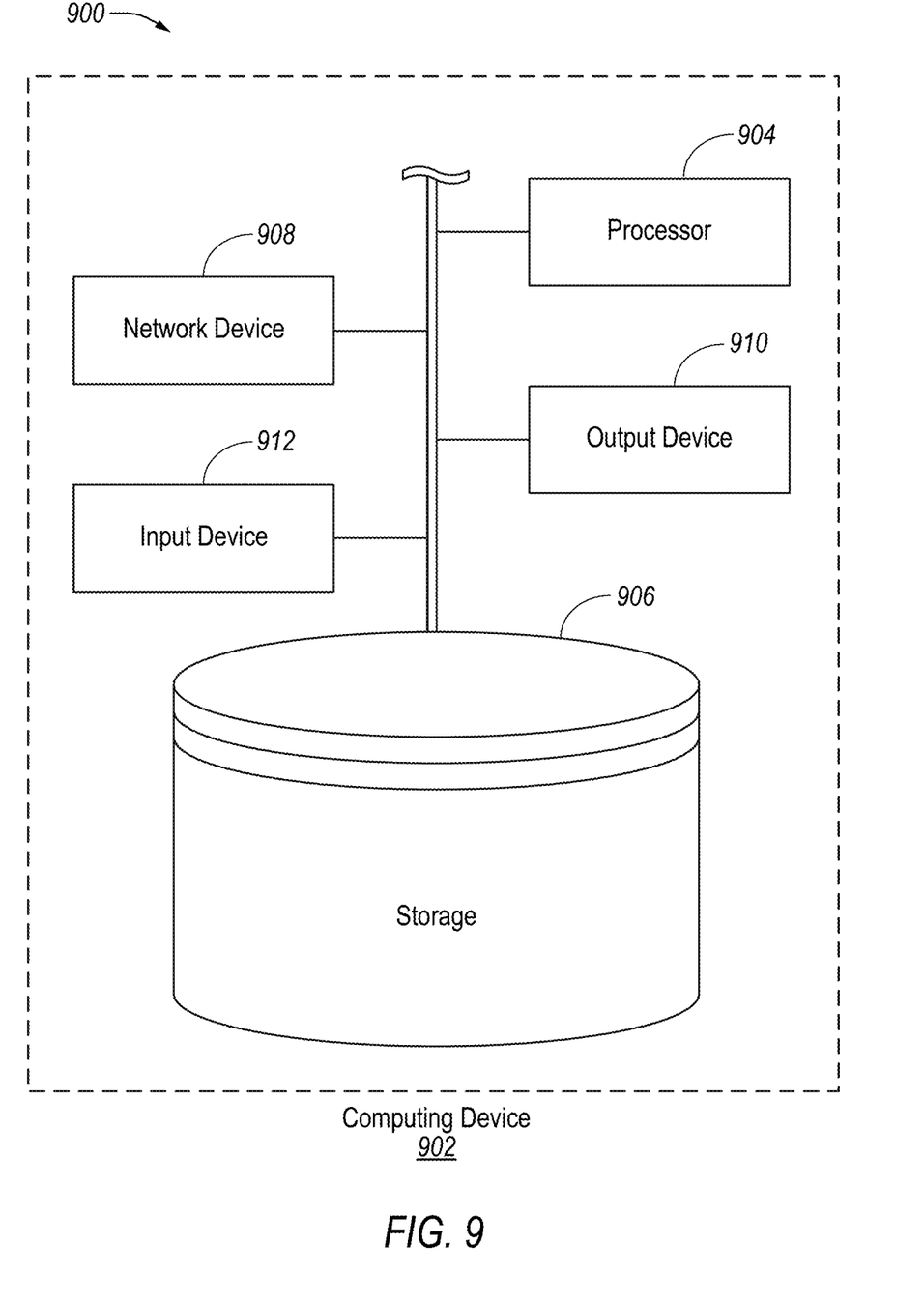
FIG. 9 illustrates an example of a computing device for implementing location-synchronous averaging of connected vehicle data.

FIG. 9 illustrates an example 900 of a computing device 902 for implementing location-synchronous averaging of connected vehicle data 126. Referring to FIG. 9, and with reference to FIGS. 1-8, the controllers 104, sensors 106, TCU 110, modem 112, communication network 113, processor 114, cloud server 124, data store 128, and client device 134 may be examples of such computing devices 902. As shown, the computing device 902 includes a processor 904 that is operatively connected to a storage 906, a network device 908, an output device 910, and an input device 912. It should be noted that this is merely an example, and computing devices 902 with more, fewer, or different components may be used.

The processor 904 may include one or more integrated circuits that implement the functionality of a central processing unit (CPU) and/or graphics processing unit (GPU). In some examples, the processors 904 are a system on a chip (SoC) that integrates the functionality of the CPU and GPU. The SoC may optionally include other components such as, for example, the storage 906 and the network device 908 into a single integrated device. In other examples, the CPU and GPU are connected to each other via a peripheral connection device such as peripheral component interconnect (PCI) express or another suitable peripheral data connection. In one example, the CPU is a commercially available central processing device that implements an instruction set such as one of the x86, ARM, Power, or microprocessor without interlocked pipeline stage (MIPS) instruction set families.

Regardless of the specifics, during operation the processor 904 executes stored program instructions that are retrieved from the storage 906. The stored program instructions, accordingly, include software that controls the operation of the processors 904 to perform the operations described herein. The storage 906 may include both non-volatile memory and volatile memory devices. The non-volatile memory includes solid-state memories, such as negative-AND (NAND) flash memory, magnetic and optical storage media, or any other suitable data storage device that retains data when the system is deactivated or loses electrical power. The volatile memory includes static and dynamic random-access memory (RAM) that stores program instructions and data during operation of the system 100.

The GPU may include hardware and software for display of at least two-dimensional (2D) and optionally three-dimensional (3D) graphics to the output device 910. The output device 910 may include a graphical or visual display device, such as an electronic display screen, projector, printer, or any other suitable device that reproduces a graphical display. As another example, the output device 910 may include an audio device, such as a loudspeaker or headphone. As yet a further example, the output device 910 may include a tactile device, such as a mechanically raiseable device that may, in an example, be configured to display braille or another physical output that may be touched to provide information to a user.

The input device 912 may include any of various devices that enable the computing device 902 to receive control input from users. Examples of suitable input devices that receive human interface inputs may include keyboards, mice, trackballs, touchscreens, voice input devices, graphics tablets, and the like.

The network devices 908 may each include any of various devices that enable the vehicles 102 and cloud server 124 to send and/or receive data from external devices over networks. Examples of suitable network devices 908 include an Ethernet interface, a Wi-Fi transceiver, a cellular transceiver, or a BLUETOOTH or BLUETOOTH Low Energy (BLE) transceiver, or other network adapter or peripheral interconnection device that receives data from another computer or external data storage device, which can be useful for receiving large sets of data in an efficient manner.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as read-only memory (ROM) devices and information alterably stored on writeable storage media such as floppy disks, magnetic tapes, compact discs (CDs), RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to strength, durability, life cycle, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system for implementing location-synchronous averaging of connected vehicle data, comprising:
    a data store configured to maintain connected vehicle data; and
    a cloud server, in communication with the data store, programmed to:
        aggregate the connected vehicle data including events occurring to a plurality of vehicles driving along roadways and location coordinates at which the respective events occurred,
        rasterize the location coordinates to discretize the events into a histogram binning, placing each event within a grid cell of the histogram and assigning each grid cell to a count of the events placed within the respective grid cell;
        perform a kernel density estimation (KDE) as a binned KDE to smoothly aggregate neighboring event counts across the histogram binning, and
        indicate locations of conditions along the roadways as being the grid cells of the histogram having a value over a predefined threshold.

2. The system of claim 1, wherein the connected vehicle data is received from the plurality of vehicles over a communication network.

3. The system of claim 1, wherein the histogram binning uses cells with a size of approximately ten-feet by ten-feet.

4. The system of claim 1, wherein the binned kernel density estimation (KDE) utilizes a two-dimensional (2D) convolution with a Gaussian kernel for smoothly aggregating the neighboring event counts.

5. The system of claim 4, wherein the KDE utilizes a Gaussian distribution with a standard deviation of three grid units of the histogram and a total support width of ten grid units of the histogram.

6. The system of claim 1, wherein the cloud server is further programmed to normalize the counts of each grid cell into a normalized severity index.

7. The system of claim 1, wherein the events of the connected vehicle data indicate wheel slip events, and the histogram defines locations most likely to lead to a loss of traction.

8. The system of claim 1, wherein the events of the connected vehicle data indicate signals raised by the plurality of vehicles that indicate one or more of unexpected change in rate of speed per unit time, speed, tire pressure, or noise experienced being by the vehicles, and the histogram defines locations along the roadways most likely to have road surface defects.

9. The system of claim 1, wherein the events of the connected vehicle data are augmented by edge processing performed by the vehicles, the edge processing including one or more of to:
    up-sample and interpolate global navigation satellite system (GNSS) information to increase position resolution of the location coordinates;
    perform fusion of data from multiple sensors better indicate road conditions;
    use tire pressure level to decouple vehicle dynamics from road surface issue magnitude estimation; or
    use in-cabin sound measurements to refine estimate of road defect type and severity.

10. A method for implementing location-synchronous averaging of connected vehicle data, comprising:
    aggregating connected vehicle data including events occurring to a plurality of vehicles driving along roadways and location coordinates at which the respective events occurred;
    rasterizing the location coordinates to discretize the events into a histogram binning, placing each event within a grid cell of the histogram and assigning each grid cell to a count of the events placed within the respective grid cell;

performing a KDE as a binned KDE to smoothly aggregate neighboring event counts across the histogram binning; and indicating locations of conditions along the roadways as being the grid cells of the histogram having a value over a predefined threshold.

11. The method of claim 10, further comprising receiving the connected vehicle data from the plurality of vehicles over a communication network.

12. The method of claim 10, wherein the histogram binning uses cells with a size of approximately ten-feet by ten-feet.

13. The method of claim 10, wherein the binned kernel density estimation (KDE) utilizes a 2D convolution with a Gaussian kernel for smoothly aggregating the neighboring event counts.

14. The method of claim 13, wherein the KDE utilizes a Gaussian distribution with a standard deviation of three grid units of the histogram and a total support width of ten grid units of the histogram.

15. The method of claim 10, further comprising normalizing the counts of each grid cell into a normalized severity index.

16. The method of claim 10, wherein the events of the connected vehicle data indicate wheel slip events, and the histogram defines locations most likely to lead to a loss of traction.

17. The method of claim 10, wherein the events of the connected vehicle data indicate signals raised by the plurality of vehicles that indicate one or more of unexpected change in rate of speed per unit time, speed, tire pressure, or noise experienced being by the vehicles, and the histogram defines locations along the roadways most likely to have road surface defects.

18. The method of claim 10, wherein the events of the connected vehicle data are augmented by edge processing performed by the vehicles, the edge processing comprising one or more of:

up-sampling and interpolating global navigation satellite system (GNSS) information to increase position resolution of the location coordinates;

performing fusion of data from multiple sensors better indicate road conditions;

using tire pressure level to decouple vehicle dynamics from road surface issue magnitude estimation; or using in-cabin sound measurements to refine estimate of road defect type and severity.

19. A non-transitory computer-readable medium comprising instructions for implementing location-synchronous averaging of connected vehicle data that, when executed by one or more processors of a cloud server, cause the cloud server to perform operations including to:

receive connected vehicle data from a plurality of vehicles over a communication network;

aggregate the connected vehicle data including events occurring to the plurality of vehicles driving along roadways and location coordinates at which the respective events occurred;

rasterize the location coordinates to discretize the events into a histogram binning, placing each event within a grid cell of the histogram and assigning each grid cell to a count of the events placed within the respective grid cell;

perform a binned KDE to smoothly aggregate neighboring event counts across the histogram binning, wherein the binned kernel density estimation (KDE) utilizes a 2D convolution with a Gaussian kernel for smoothly aggregating the neighboring event counts;

normalize the counts of each grid cell into a normalized severity index; and indicate locations of conditions along the roadways as being the grid cells of the histogram having a value along the normalized severity index over a predefined threshold.

20. The non-transitory computer-readable medium of claim 19, wherein the events of the connected vehicle data are augmented by edge processing performed by the vehicles, the edge processing comprising one or more of:

up-sampling and interpolating global navigation satellite system (GNSS) information to increase position resolution of the location coordinates;

performing fusion of data from multiple sensors better indicate road conditions;

using tire pressure level to decouple vehicle dynamics from road surface issue magnitude estimation; or using in-cabin sound measurements to refine estimate of road defect type and severity.

* * * * *